United States Patent [19]

Faust

[11] Patent Number: 5,172,620

[45] Date of Patent: Dec. 22, 1992

[54] MONOTUBE OPTICAL FIBER CABLE CUTTER AND METHOD OF USING THE SAME

[75] Inventor: Alison M. Faust, Hickory, N.C.

[73] Assignee: Alcatel NA Cable Systems, Inc., Claremont, N.C.

[21] Appl. No.: 742,299

[22] Filed: Aug. 8, 1991

[51] Int. Cl.$^5$ .................. G02B 6/245; H02G 1/12
[52] U.S. Cl. ........................ 83/13; 30/91.2; 81/9.44
[58] Field of Search ............... 83/13; 30/90.1, 90.2, 30/90.3, 90.4, 90.6, 90.7, 90.8, 90.9, 91.1, 91.2; 81/9.4, 9.51, 9.41, 9.42, 9.43, 9.44

[56] References Cited

U.S. PATENT DOCUMENTS

| | | | |
|---|---|---|---|
| D. 307,534 | 5/1990 | Bieganski | D8/51 |
| 2,660,783 | 12/1953 | Davis et al. | 30/91.2 X |
| 3,180,184 | 4/1965 | Bradley | 30/90.1 |
| 4,577,405 | 3/1986 | Butler | 81/9.4 X |
| 4,741,104 | 5/1988 | Noon | 30/90.4 |
| 4,815,814 | 3/1989 | Ulijasz | 30/91.2 X |
| 4,920,830 | 5/1990 | Stepan | 81/9.51 |
| 4,969,703 | 11/1990 | Fyfe et al. | 350/96.2 |
| 4,986,148 | 1/1991 | Krampe | 81/9.44 X |

Primary Examiner—Frank T. Yost
Assistant Examiner—Raymond D. Woods
Attorney, Agent, or Firm—Ware, Fressola, Van der Sluys & Adolphson

[57] ABSTRACT

A cutting tool and method of using the same provide for cutting the protective elements of a monotube-type optical fiber cable without severing the buffer tube in order to access the buffer tube and the optical fibers found therein. The cable cutter includes a pair of handles with a pair of blades connected to the handles in the same manner as a typical shear-type cable cutter. The blades are designed with specifically dimensioned slots to protect the buffer tube from being severed while allowing the remaining cable components to be cut by the blades. An alignment slot is utilized in one blade to align the cable to be cut. In a second embodiment, strength member slots are formed in each blade for allowing the strength members of the monotube cable to remain unsevered while the remaining protective components are cut.

17 Claims, 2 Drawing Sheets

MONOTUBE OPTICAL FIBER CABLE CUTTER AND METHOD OF USING THE SAME

BACKGROUND OF THE INVENTION

1. Field of the Invention

This invention relates to a tool and method for cutting the protective elements of a monotube optical fiber cable without severing the buffer tube in order to access the buffer tube and the optical fibers found therein.

2. Description of the Prior Art

The use of optical fibers in telephonic and other communication is well-known in the prior art. In order to protect the delicate optical fibers and to facilitate the laying of optical fibers, it is well-known to dispose a number of fibers in a monotube-type optical fiber cable.

In a known cable assembly 10, as shown in FIG. 1, a single large plastic, gel-filled buffer tube 12 can contain approximately 100 optical fibers 14. A similar cable assembly is manufactured by Alcatel Cable Systems which is described in U.S. patent application Ser. No. 07/468,470, filed Jan. 22, 1990 and sold under the designation 'Unitube Optical Fiber Cable', now U.S. Pat. No. 5,029,974. The single centrally elongate buffer tube 12, or "monotube", may be surrounded by water-swellable tape or, as shown in FIG. 1, radial strength yarns 16. The radial strength yarns 16 are made of either aramid or fiberglass materials and are contrahelically stranded around the buffer tube 12 and impregnated with filling compound such as a petroleum-based hot melt filling compound manufactured by Witco Corporation, New York, N.Y., or Amoco Chemical Company, Chicago, Ill. Corrugated steel armor 18 is applied over the radial strength yarns 16. The corrugated armor 18 is flooded with a water-blockable flooding compound such as a hot melt adhesive or a petroleum-based flooding compound. A high strength rip cord 20 is applied under the armor 18 to aid in sheath removal. Two steel strength members 22 are located 180° apart on the outside of the corrugated armor 18. A medium-density polyethylene (MDPE) outer jacket 24 encapsulates the steel strength members 22 and corrugated armor 18 to complete the structure. A water-blockable flooding compound is disposed between the corrugated armor 18 and the outer jacket 24. The cable assembly does not necessarily have to have the corrugated armor 18.

While optical fibers have many advantages over traditional conducting cable in the communications field, such as high density and lack of electromagnetic interference, they have a major disadvantage in that there is degradation in transmission efficiency after a fiber has been spliced or joined with another fiber after the original manufacture. Such a splice may be inevitable in the event of fiber breakage, the rerouting of a communications line or the insertion of an intermediate device within the communications line. However, such a splice may only be required for a single or a limited number of fibers within the monotube. Under such circumstances, it is extremely time consuming and degrading to the communication efficiency to completely sever and subsequently splice all the optical fibers in a monotube in order to access a single optical fiber. It is, therefore, advantageous to utilize a device which allows access to a limited number of fibers within the monotube without cutting or otherwise disturbing the remaining optical fibers.

Presently, there are various optical fiber access tools for use with monotube design optical fiber cables. For instance, AT&T Western Electric manufactures Unit Slitter Tool (961B or 961C) for accessing the optical fibers within a monotube. However, before the Unit Slitter Tool can be used, all of the monotube cable's protective elements, such as the polyethylene outer jacket, the strength members, the corrugated armor jacket and the radial strength yarns, must be removed in order to provide access to the monotube.

Another optical fiber access tool is manufactured by Alcatel Cable Systems and is described in U.S. patent application Ser: No. 07/713,749, filed June 11, 1991 under the title Monotube Cable Fiber Access Tool, now U.S. Pat. No. 5,140,751, . In using this tool, it is also necessary to remove all of the protective elements of the monotube cable, with the exception of the longitudinally extending strength members, in order to utilize the tool for accessing the optical fibers within the monotube.

At present, in order to provide access to the buffer tube within the monotube optical fiber cable so the previously described tools can be used, various methods and tools have been utilized to strip away the outer cable components including the jacket, rigid strength members and steel corrugated shield. For instance, one current method requires at least six items: (1) razor blades (for cutting the outer jacket); (2) needle-nose pliers (for removing the outer jacket and corrugated shield); (3) a small screwdriver (for peeling back the corrugated shield); (4) a pair of wire cutters (for severing the rigid strength members); (5) a pair of tin snips (for cutting the corrugated shield); and (6) scissors (for cutting the radial strength yarns and the rip cord). This procedure requires a substantial amount of time (at least eight minutes) for an experienced operator. In addition, it is potentially hazardous to the operator because of the sharp tools involved which require proficient handling in order to avoid injury to the user. The potential danger of loose razor blades, wire cutters and scissors in a busy work environment such as in the field is great.

In addition, due to the filling compounds used, such as the petroleum-based hot melt filling compound or the hot melt adhesive, the above-referenced procedure is quite messy and sticky because of the compound that is encountered when removing the protective elements.

Also, oftentimes, it is desirable to leave the strength members intact for providing additional cable support thereby creating even more difficulty in accessing the buffer tube. For instance, the strength members are left intact when the previously mentioned Alcatel fiber access tool is used. When the strength members are not severed, it is quite difficult to remove all of the monotube cable's protective elements, i.e., the corrugated armor jacket and the radial strength yarns as the positioning of the strength members make it difficult to manipulate the screwdriver, the scissors and the tin snips as required.

As can clearly be seen, providing an optical fiber cable cutter for use with a monotube optical fiber cable for accessing the central buffer tube is a difficult problem which has not been previously resolved. Even with the current level of understanding of optical fiber cables, there has not previously been a practicable optical fiber cable cutter which can sever all necessary cable components in a single operation to obtain buffer tube access although such a tool would be desirable.

SUMMARY OF THE INVENTION

It is therefore a object of this invention to provide an optical fiber cable cutter for use with a monotube-type optical fiber cable which allows access to the monotube without intrusion therein.

A further object is to provide an optical fiber cable cutter which may be used on a monotube optical fiber cable to allow the operator to easily access the monotube without severing the rigid strength members of the monotube cable.

Still another object of this invention is to provide an optical fiber cable cutter which does not have loose, sharp tools which may be hazardous to the operator, performs the cutting action in essentially a single step, and is resistant to malfunction which may cause damage to the optical fibers.

An additional object is to provide an optical fiber cable cutter which may be fabricated readily and relatively economically and which will enjoy a long life in operation.

In accordance with the present invention, an optical fiber cable cutter is provided which includes a pair of handles and first and second blades attached to the handles, the blades being hingedly attached for relative shearing movement for cutting the cable.

The two blades are hingedly joined together by a single bolt so that they may move relative to each other for providing a shearing action on the protective elements of the monotube optical fiber cable. The blades are designed with specifically dimensioned slots to protect the buffer tube from being severed while completely severing the other cable protective components. Thus, when the blades are completely closed, an aperture having the approximate diameter of the buffer tube remains so that the buffer tube remains unsevered.

In a second embodiment, the blades are designed with two additional slots for protecting the rigid strength members, as well as the buffer tube, from being severed while completely cutting the remaining cable protective components. Thus, in the second embodiment, when the blades are completely closed, three apertures remain, two of the apertures having the approximate diameter of the rigid strength members and a single center aperture having the approximate diameter of the buffer tube.

Using this cutter, only two tools are needed to access the buffer tube at termination: (1) the cable cutter of the present invention (for severing the jacket, corrugated armor and rigid strength members (first embodiment only); and (2) scissors for cutting the radial strength yarns and the rip cord. It requires less than two minutes for an experienced operator to access the buffer tube and removes the dangerous sharp tools from the procedure. In addition, the procedure is more convenient and less messy as it lessens the user's contact with the flooding compound.

BRIEF DESCRIPTION OF THE DRAWINGS

Further objects and advantages of the invention will become apparent from the following description and claims, and from the accompanying drawings wherein:

DESCRIPTION OF THE PREFERRED EMBODIMENTS

Figure 1:
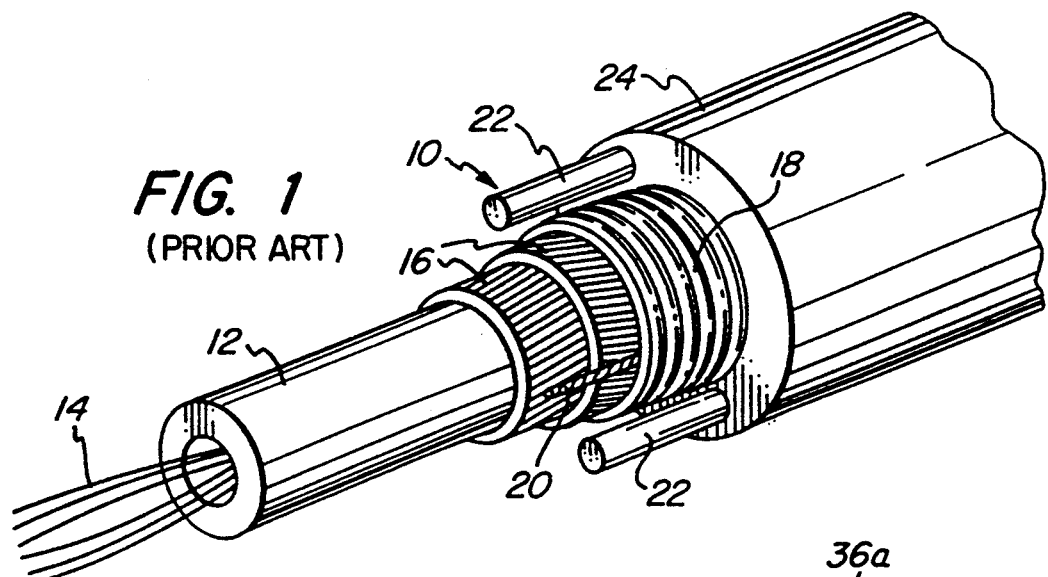
FIG. 1 is a perspective cutaway section of the prior art Alcatel Cable System Unitube Optical Fiber Cable design.
Figure 2:
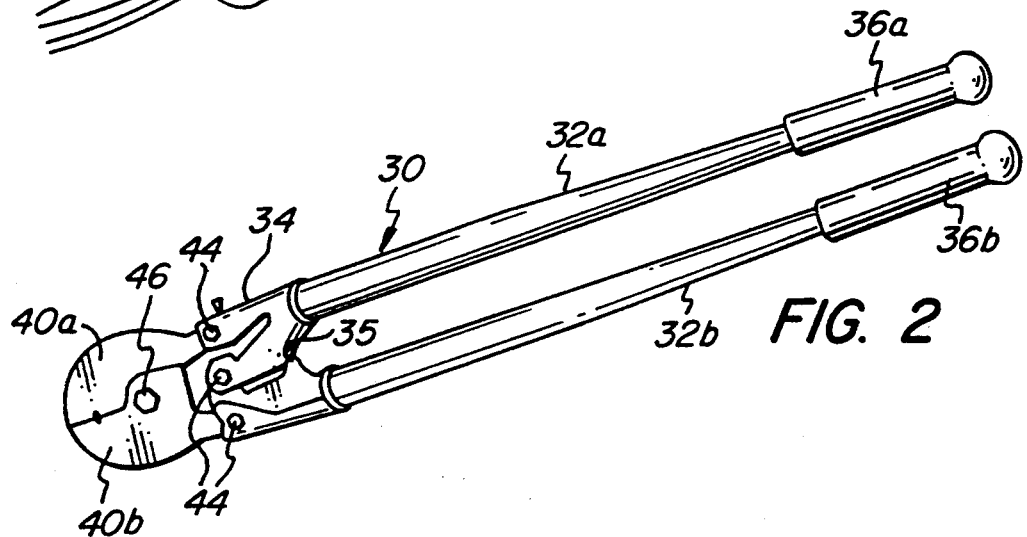
FIG. 2 is a perspective view of a monotube optical fiber cable cutter made in accordance with the present invention.

Referring now to the drawings wherein like numerals indicate like elements throughout the several views, the cable cutter 30 of the present invention includes first and second handles 32a, 32b, each handle having a rubber grip 36a, 36b at one of its ends. The cable cutter 30 further comprises first and second blades 40a, 40b connected to the handles 32a, 32b by bolts 44 in a known manner as in a typical shear-type cable cutter. In a well known manner, an operating mechanism 34 of the cutter 30 provides a mechanical advantage to the user when cutting pressure is placed on the handles 32a, 32b. An abutment surface 35 limits the approach of the handles 32a, 32b and thus their attached blades 40a, 40b.

Figure 3:
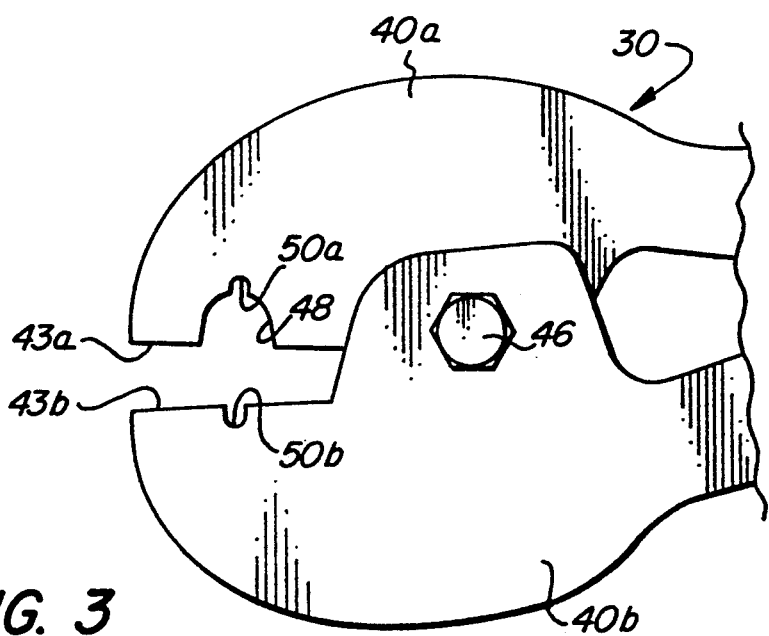
FIG. 3 is a fragmentary side elevational view showing the blades of the cable cutter of the present invention.
Figure 4:
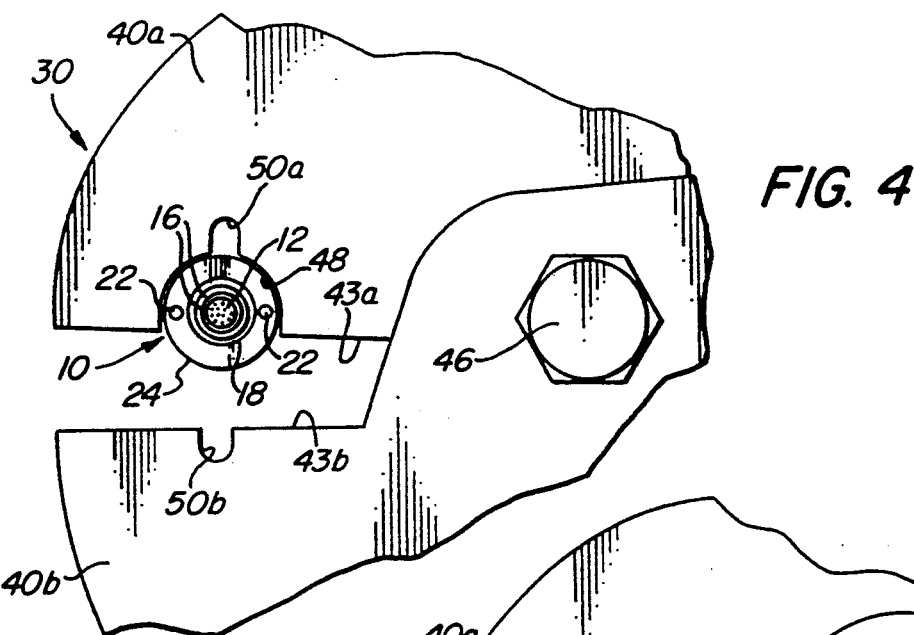
FIG. 4 is a fragmentary side elevational view showing a monotube cable aligned for use with the cable cutter of the present invention.
Figure 5:
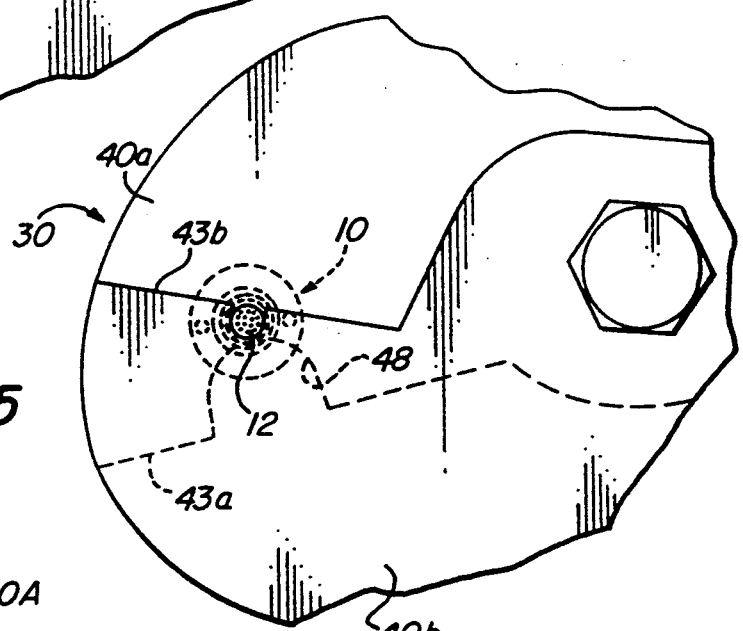
FIG. 5 is a fragmentary side elevational view showing the cutter in operation after a monotube cable is cut.

As best seen in FIGS. 3 through 5, the first and second blades 40a, 40b are hingedly joined by a hinge bolt 46 so that they may pivot with respect to each other around the hinge bolt 46 in a shearing relationship. Each blade 40a, 40b has a cutting edge 43a, 43b for severing the monotube cable protective elements 18, 22 and 24. The blades 40a, 40b are designed for protecting the buffer tube from being severed while completely cutting the remaining cable protective components. In particular, the first blade 40a has a cable alignment slot 48 which is semi-circular in shape. The cable alignment slot 48 has a diameter slightly larger than the diameter of the monotube optical fiber cable 10 being cut. First blade 40a further has a first buffer tube slot 50a which is semi-circular in shape and has a diameter substantially the same as the diameter of the buffer tube 12 in the monotube optical fiber cable 10. The first buffer tube slot 50a is positioned approximately midway along the circumference of the semi-circular cable alignment slot 48. The second blade 40b has a corresponding second buffer tube slot 50b identical to the buffer tube slot 50a. The second buffer tube slot 50b is semi-circular in shape having a diameter substantially the same as the diameter of the buffer tube 12 in the monotube optical fiber cable 10. The buffer tube slots 50a, 50b are positioned the same radial distance from the pivot point defined by the hinge bolt 46 so that when first and second blades 40a, 40b are completely closed, as limited by the abutment surface 35, the buffer tube slots 50a, 50b overlap to the extent necessary to form a circular aperture having a diameter substantially the same as that of the buffer tube 12 of the monotube optical fiber cable 10.

The operation of the cable cutter 30 of the present invention is illustrated in FIGS. 4 through 5. The monotube cable 10 is positioned within the cable alignment slot 48 of the first blade 40a. The monotube cable 10 must be aligned so that when the first and second blades 40a, 40b are completely closed, strength members 22 are out of the way of the first and second buffer tube slots 50a, 50b. Such alignment can be accomplished using appropriate indexing marks (not shown) normally found on the cable jacket 24. In this way, after the cutting operation is performed, the buffer tube 12 remains unsevered in the aperture formed by the first and second buffer tube slots 50a, 50b while the cable elements 18, 22 and 24 are severed by cutting blades 40a, 40b as shown in FIG. 5. Cable elements 16 and 20 can be trimmed with a scissor.

Figure 6:
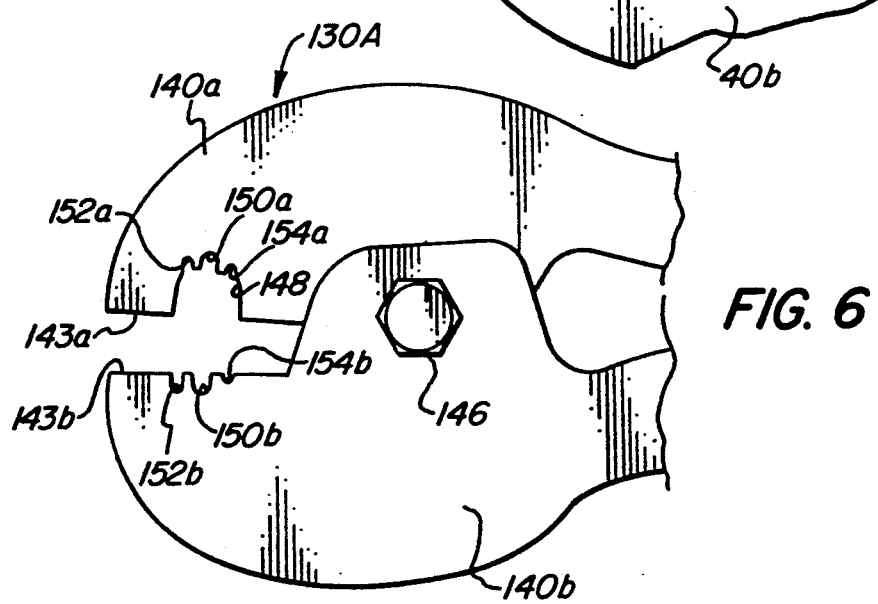
FIG. 6 is a fragmentary side elevational view of the blade portion of the second embodiment of the cable cutter of the present invention.

FIG. 6 illustrates a second embodiment of the cable cutter 130 of the present invention for leaving both the buffer tube 12 and the strength members 22 intact after the cutting operation. As in the first embodiment, a pair of blades 140a, 140b are pivoted together by a hinge bolt 146 and have cutting edges 143a, 143b for severing the protective elements of the monotube cable 10. First blade 140a has a cable alignment slot 148 along the cutting edge 143a for aligning the monotube cable 10 to be cut. The first and second blades 140a, 140b each have three slots therein. Center buffer tube slots 150a, 150b are flanked by strength member slots 152a, 152b and 154a, 154b. The buffer tube slots 150a, 150b are semicircular in shape having a diameter substantially equal to the diameter of the buffer tube 12 of the monotube optical fiber cable 10 to be cut. Similarly, the strength member slots 152a, 152b, 154a, 154b have a diameter substantially the same as the diameter of the strength members 22 of the monotube optical fiber cable 10. The shape and position of the strength member slots 152a, 152b, 154a, 154b must be designed so that when the blades are completely closed, the strength members 22 are allowed to remain unsevered as is the buffer tube 12. In this manner, the cable cutter 130 of the second embodiment allows the operator to sever the protective elements 18 and 24 of the monotube cable 10 without severing the buffer tube 12 or the longitudinally extending rigid strength members 22.

Thus, it can be seen from the foregoing specification and the attached drawings that the cable cutter of the present invention provides an effective means for gaining access to the buffer tube in a monotube optical fiber cable.

While the preferred embodiments admirably achieve the objects of the invention, it will be appreciated that departures can be made by those skilled in the art without departing from the spirit and scope of the invention which is limited only by the following claims.

What is claimed is:

1. A tool for cutting a monotube optical fiber cable having a single buffer tube extending longitudinally therein with protective elements surrounding the buffer tube for protecting the buffer tube, said tool comprising:
   first and second cutting blades for cutting the protective elements of the cable without severing the buffer tube, said cutting blades being supported for relative shearing movement between an open position and a closed position, said cutting blades partially overlapping each other in said closed position, said first and second cutting blades each having a buffer tube slot dimensionally sized for receiving the buffer tube when said cutting blades are in said closed position; and
   means for aligning the monotube cable between said first and second cutting blades when said cutting blades are in said open position, said cable aligning means comprises a cable alignment slot in said first cutting blade, said cable alignment slot being semicircular in shape and having a diameter substantially the same as an outer diameter of the monotube cable.

2. The tool in accordance with claim 1, wherein said first cutting blade buffer tube slot is positioned midway along a circumference of said cable alignment slot.

3. The tool in accordance with claim 1, wherein said buffer tube slots are semi-circular in shape having a diameter substantially the same as the buffer tube.

4. The tool in accordance with claim 1, wherein said cutting blades each have at least one strength member slot dimensionally sized to receive a strength member of the monotube cable when said cutting blades are in said closed position, said strength member slots on said blades cooperating to form at least one aperture having a diameter substantially equal to a diameter of a strength member of the monotube cable.

5. The tool in accordance with claim 4, wherein said at least one strength member slot in each blade is two strength member slots in each blade, said strength member slots in each blade being positioned on either side of its respective buffer tube slot in each cutting blade, said strength member slots of said blades cooperating with one another to form a pair of apertures having diameters substantially the same as strength members of the monotube cable when said cutting blades are in said closed position.

6. The tool in accordance with claim 1, wherein said means for aligning the monotube cable fixedly positions the monotube cable relative to said first cutting blade when said cutting blades are in said open position.

7. A tool for use with a monotube optical fiber cable having a single longitudinally extending buffer tube with optical fibers disposed therein, two elongate strength members disposed on either side of the buffer tube, and protective members disposed around the buffer tube, said tool comprising:
   first and second cutting blades supported for relative shearing movement past one another between an open position and a closed position, said first and second cutting blades each having a semi-circular buffer tube slot, whereby said cutting blades cooperate to form a circular aperture having a diameter substantially the same as the buffer tube when said first and second cutting blades are in said closed position; and
   means for aligning the monotube cable between said first and second cutting blades when said cutting blades are in said open position, said cable aligning means comprises a cable alignment slot in said first cutting blade, said cable alignment slot being semicircular in shape and having a diameter substantially the same an outer diameter of the monotube cable.

8. The tool in accordance with claim 7, wherein each of said cutting blades further have first and second strength member slots disposed on either side of said buffer tube slot for receiving the strength members, said first and second strength member slots of said first cutting blade cooperating with said first and second strength member slots of said second cutting blade to form first and second strength member apertures circular in shape having a diameter substantially the same as the strength members when said first and second cutting blades are in said closed position.

9. The tool in accordance with claim 7, wherein said means for aligning the monotube cable fixedly positions the monotube cable relative to said first cutting blade when said cutting blades are in said open position.

10. A method for cutting a monotube optical fiber cable comprising the steps of:

providing a monotube optical fiber cable having a single buffer tube extending longitudinally therein with protective elements surrounding said buffer tube for protecting the buffer tube;

providing a cutting tool having first and second cutting blades for cutting said protective elements of said cable without severing said buffer tube, said cutting blades being supported for relative shearing movement between an open position and a closed position, said cutting blades partially overlapping each other in said closed position, said first and second cutting blades each having a buffer tube slot dimensionally sized for receiving said buffer tube when said cutting blades are in said closed position, said cutting tool further includes means for aligning said monotube cable between said first and second cutting blades when said cutting blades are in said open position, said cable aligning means comprises a cable alignment slot in said first cutting blade, said cable alignment slot being semi-circular in shape and having a diameter substantially the same as an outer diameter of the monotube cable;

inserting said monotube optical fiber cable between said cutting blades when said cutting blades are in said open position and aligning said monotube cable in said aligning means; and providing relative shearing movement to said cutting blades between said open and closed positions thereby severing said protective elements surrounding said buffer tube.

11. The method in accordance with claim 10, wherein said first cutting blade buffer tube slot is positioned midway along a circumference of said cable alignment slot.

12. The method in accordance with claim 10, wherein said buffer tube slots are semi-circular in shape having a diameter substantially the same as said buffer tube.

13. The method in accordance with claim 10, wherein said aligning step fixedly positions the monotube cable relative to said first cutting blade when said cutting blades are in said open position.

14. A method for cutting a monotube optical fiber cable comprising the steps of:

providing a monotube optical fiber cable having a single longitudinally extending buffer tube with optical fibers disposed therein, two elongate strength members disposed on either side of said buffer tube, and protective members disposed around said buffer tube;

providing first and second cutting blades supported for relative shearing movement past one another between an open position and a closed position, said first and second cutting blades each having a semi-circular buffer tube slot, whereby cutting blades cooperate to form a circular aperture having a diameter substantially the same as said buffer tube when said first and second cutting blades are in said closed position, said cutting tool further includes means for aligning said monotube cable between said first and second cutting blades when said cutting blades are in said open position, said cable aligning means comprises a cable alignment slot in said first cutting blade, said cable alignment slot being semi-circular in shape and having a diameter substantially the same as an outer diameter of the monotube cable;

inserting said monotube optical fiber cable between said cutting blades when said cutting blades are in said open position and aligning said monotube cable in said aligning means; and providing relative shearing movement to said cutting blades between said open and closed positions thereby serving at least said protective members surrounding said buffer tube.

15. The method in accordance with claim 14, wherein said first and second cutting blade providing step includes each of said cutting blades further have first and second strength member slots disposed on either side of said buffer tube slot for receiving said strength members, said first and second strength member slots of said first cutting blade cooperating with said first and second strength member slots of said second cutting blade to form first and second strength member apertures circular in shape having a diameter substantially the same as said strength members when said first and second cutting blades are in said closed position.

16. The method in accordance with claim 14, wherein said relative shearing movement providing step includes severing said strength members.

17. The method in accordance with claim 14, wherein said aligning step fixedly positions the monotube cable relative to said first cutting blade when said cutting blades are in said open position.

* * * * *

UNITED STATES PATENT AND TRADEMARK OFFICE
CERTIFICATE OF CORRECTION

PATENT NO. : 5,172,620

DATED : December 22, 1992

INVENTOR(S) : Alison M. Faust

It is certified that error appears in the above-identified patent and that said Letters Patent is hereby corrected as shown below:

column 6, line 52, after "same", --as-- should be inserted.

column 8, line 8, after "whereby", --said-- should be inserted.

column 8, line 27, "serving" should be --severing--.

Signed and Sealed this

Twenty-sixth Day of October, 1993

Attest:

BRUCE LEHMAN

*Attesting Officer*  *Commissioner of Patents and Trademarks*